Nov. 17, 1970  M. SETTLER ET AL  3,541,590
PHYSIOLOGICAL PULSE METER
Filed June 24, 1965
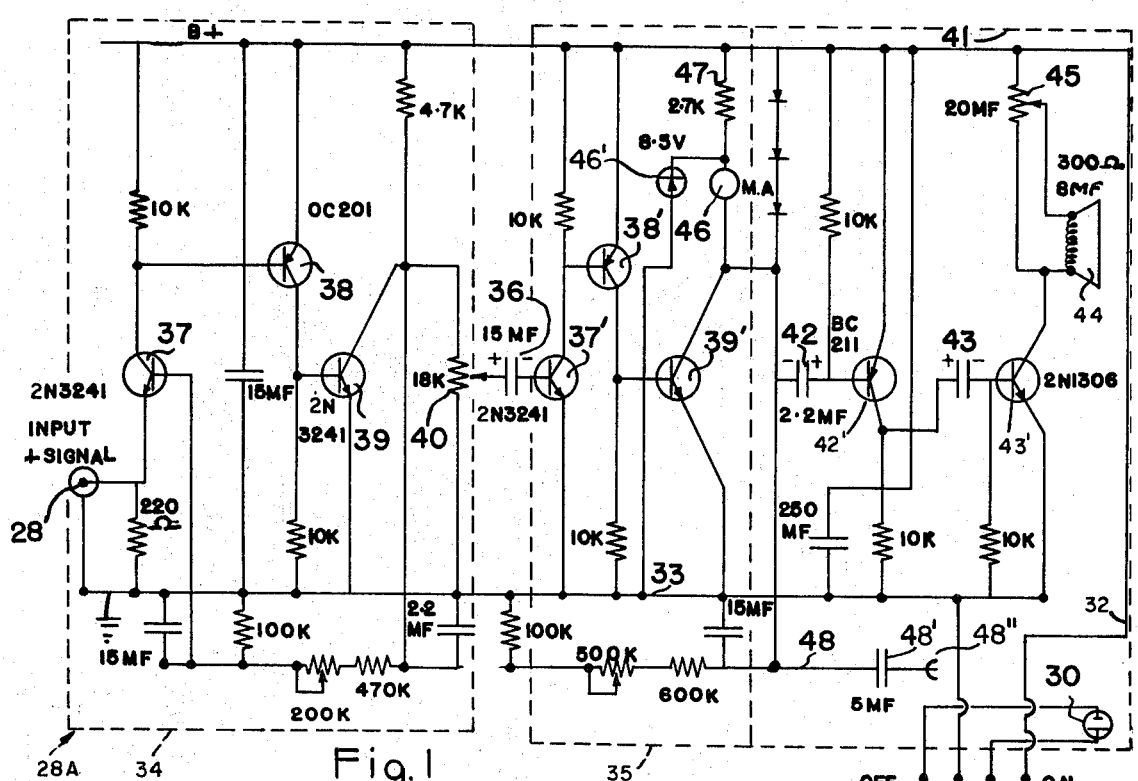

United States Patent Office 3,541,590
Patented Nov. 17, 1970

3,541,590
PHYSIOLOGICAL PULSE METER
Morris Settler and Bert Settler, Winnipeg, Manitoba, Canada, assignors, by mesne assignments, to Manitoba Development Fund, Winnipeg, Manitoba, Canada
Filed June 24, 1965, Ser. No. 466,721
Int. Cl. A61b 5/02
U.S. Cl. 128—2.05
8 Claims

ABSTRACT OF THE DISCLOSURE

A pulse meter having both aural and visual readouts includes an electromechanical pulse transducer having a magnetic core with an annular recess, a diaphragm-supported voice coil located in the recess and connected to a multistage, capacitive-coupled amplifier and a resilient buffer connected between the outer end of the voice coil the end of core within the coil.

---

This invention relates to new and useful improvements in pulse meters and is designed to monitor certain physiological phenomena such as pulse, blood pressure, peripheral circulation, responsiveness, distensibility and elasticity of arteries.

Certain physiological phenomena occurring within the human body may be heard or recorded using various techniques such as a stethoscope, the oscilloscope or electro-cardiograph (E.C.G.). However, these suffer from several disadvantages particularly under surgical conditions.

The majority of instruments require the concentrated attention of the anaesthetist. When the pulse rate is being taken, it is known only for the duration of the time that the anaesthetist is taking it. The present device overcomes the disadvantages inherent with conventional instruments by permitting the pulse rate to be taken at the thumb, toe, carotid artery or elsewhere. The devices give a constant audible or visible signal which will relieve the attendant of the concentration required and give him a continual impression of the pulse rate and regularity thereof. This gives the anesthesiologist invaluable help in diagnosing circulatory difficulties during surgery. Similarly, with a clinical researcher investigating vascular disorders, this device will detect peripheral pulsations and is a more accurate detection of incipient shock than the display of the electrical potential of the heart by the conventional electro-cardiogram.

In other words, this device can monitor the peripheral circulation rather than monitor the cardiac electrical activity.

Furthermore, this particular pulse meter can be used for locating the exact position of a block in the artery. Since arterial pulsations are relatively weak, it is necessary to incorporate a novel transducer and connect same to an amplifier both of which are insensitive to muscular movement, airborne sounds, spurious noises and artifacts.

The novel transducer is designed so that a combination of the mechanical distention of the skin and the peripheral pulse is picked up. This means that the diaphragm of the voice coil is in contact with the skin and it is therefore necessary to prevent the voice coil from contacting the magnet core. A novel resilient bumper or buffer is therefore inserted between the exposed end of the voice coil and the core of the magnet thus preventing direct contact. This not only ensures that the transducer does not blank out but also extends the life of the transducer by protecting the moving voice coil from mechanical damage.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIG. 1 is a schematic wiring diagram of the electronic portion of the device.

FIG. 2 is an enlarged side sectional elevation of the transducer.

FIG. 3 is a front end view of FIG. 2.

FIG. 4 is an enlarged partially sectioned view of the transducer incorporated with a pulse wave velocity measuring device.

FIG. 5 is an enlarged fragmentary sectional view of the transducer.

In the drawings like characters of reference indicate corresponding parts in the different figures.

Proceeding therefore to describe out invention in detail, reference should first be made to FIGS. 2 and 3 in which the novel transducer is shown.

A conventional cylindrical iron magnet 10 is provided with a conventional voice coil 11 movable linearly with relation to the core 12 of the magnet responsive to mechanical movement or peripheral pulsations impinging upon the diaphragm.

This voice coil is mounted by a flexible spider 13 to adjacent the outer perimeter 14 of the magnet in the conventional manner and a fibre disc 15 is adhesively secured over the exposed open end 16 of the voice coil and acts as the aforementioned diaphragm.

Situated between the diaphragm 15 and the end 17 of the magnet core 12 is a resilient buffer or bumper 18 taking the form of a ring of elestic or similar material. This prevents the disc or diaphragm 15 from contacting the end 17 of the magnet core and protects the voice coil from mechanical damage.

The magnet 10 is enclosed within a case 19 of plastic or the like having a centrally apertured cover 20 secured thereto.

The aforementioned central aperture 21 of the cover 20 exposes the diaphram 15 as illustrated.

The wires 22 from the voice coil 11 are conveyed through an aperture 23 in the side of the casing and continue as a coaxial cable 24 where they may be connected to the input of the amplifier which will hereinafter be described.

We have provided a pair of studs 25 or the like on the back wall 26 of the casing so that the transducer may be secured to a flexible band 27 of suitable material adapted to attach the transducer in the desired location upon the patient. This band is provided with fastening means (not illustrated) which are conventional.

The transducer hereinbefore described is a high gain, low impedance, linear type transducer, rugged and inexpensive and capable of producing enough signal voltage in the range of 300–700 microvolts, e.g. from the movement of the peripheral pulsations of the thumb, forefinger, carotid artery or the like.

The coaxial cable 24 extending from the transducer is connected to input 28 of the electronic amplifier collectively designated 28a, the details of which are shown in FIG. 1.

It is preferable that rechargeable battery 29 be provided as a source of power for the electronics sections selectively connectable to a battery charger 30 which may be connected to the mains in order to recharge the battery when the device is not being used.

Switch 31 enables the operator to connect the battery either to the charger input 30 or the electronic section.

This battery provides B plus current via the conduit 32, the negative side of the battery being connected to ground as indicated by reference character 33.

The amplifier comprises a pair of multi-stage amplifiers generally designated 34 and 35 and these two amplifiers are connected together by means of a coupling capacitor 36.

An electrical pulse is formed by the windings of the voice coil cutting the magnetic field of the magnet when the voice coil is moved linearly as aforesaid.

This forms the input signal which is fed to input jack 28 and thence to the emitter of transistor 37 (NPN).

This pulse switches this material on and the signal from the collector of transistor 37, changes the bias on transistor 38 (PNP) in the reverse direction, thus switching it off; switching transistor 38 off, biases transistor 39 so that it is turned on.

We have found that the polarity of the input from the transducer is extremely important. We use an NPN transistor 37 in the first stage and the input is connected to the emitter of this transistor. Therefore, the input is made positive and switches off the transistor. By this means we find the sensitivity of the device is increased approximately three fold, compared to the sensitivity if the polarity is negative.

The second amplifier 35 is similarly provided with three inter-connected first, second and third stage transistors 37', 38' and 39'.

The signal from transistor 39 passes through a coupling capacitor 36 and biases transistor 37' on; the signal from the collector of transistor 37' passes to the base of transistor 38' and turns this transistor off; transistor 38' in the off condition, biases transistor 39' on; the meter 46 measures the collector current in transistor 39' and is a visual indication of the pulse.

This consists of a milliameter connected between the output of transistor 39', via limiting resistor 47 to the B plus supply 32.

Inasmuch as the input consists of pulses from the transducer, it will be appreciated that the needle of the milliammeter 46 will deflect in synchronization with the pulse sound being emitted by the speaker 44 as will herinafter be described.

An 8.5 v. Zener diode 46' keeps a constant voltage supply on transistor 39'. The output from this last stage transistor 39' of the second amplifier 35 is then fed to an output amplifier stage and gating circuit collectively designated 41, via coupling condenser 42.

The signal of transistor 39', through the coupling condenser or capacitor 42, biases transistor 42' off; transistor 42' being off, turns the gating transistor 43' on through coupling capacitor 43, which in turn puts the speaker 44 across battery 29 emitting a sound synchronous with the pulse, adjustable resistor 45 controlling the volume output of the speaker.

The 18K potentiometer 40 ahead of the coupler 36 sets the trigger level determined by the strength of the human peripheral pulse; all the components below the point 33 or ground or common line, including 15 mfd. capacitor, 100K resistor, 200K, 470K resistors, 2.2 mfd. capacitor, 100K, 500K, 600K resistors and 15 mfd. capacitor constitute the feed back circuits for all sections of the pulse amplifier excluding the last two transistors 42' and 43' which form the gating circuit for the audible sound.

The 5 mfd. capacitor coupler 48' beyond the point marked 48 in FIG. 1, is connected to an output jack 48" for oscilloscopic or oscillographic display of the peripheral pluse wave.

Reference character 30 is an input jack for the isolation transformer charger to charge the battery 29 which is a nickel cadmium rechargeable battery.

The coupling capacitor 36 permits the first amplifier 34 to trigger the second amplifier 35 when the amplified impulse is fed to the input.

Also provided is a recorder output 48 connected to the output of the last stage transistor 39' and this output may be connected to an oscilloscope or a pen recorder shown schematically at 49 in FIG. 4.

This pen recorder is of particular value when it is desired to determine the pulse wave velocity.

Under these circumstances, the embodiment of the transducer shown in FIG. 4 is required.

This consists of an hydraulic coupling collectively designated 50 comprising a hollow cylindrical casing 51 screw threadably secured to the end 52 of the transducer casing 19.

A flexible diaphragm 53 is clamped to the end of the casing 19 by the cylinder 51, between shouldered ring 54 and seal 55 and this diaphragm is in contact with aforementioned disc 15 spanning the exposed end of the voice coil 11.

Coaxial with the other end 56 of the cylinder 51 is a further cylinder 57 reduced in diameter from the first cylinder 51 and to this is secured a relatively small diametered tube 58 to which may be connected an intra-arterial catheter (not illustrated).

The cylinders 51 and 57 are filled with saline solution 59 or the equivalent acting as an hydraulic fluid, and a branch tube 60 is provided with petcock 61 for the removal of air bubbles.

This means that the transducer is hydraulically coupled to the catheter so that the pulse wave of the blood in the artery is transmitted to the transducer and thence to the amplifier.

By connecting the aforementioned pen recorder 49 to the amplifier, a record of the pulse is made.

The coupling condenser 36 between the two amplifiers can be chosen to give a substantially vertical blip to mark the exact beginning of an arterial pulse wave. A definitive recording of these vertical blips can furnish the clinical researcher with a more expedient method of determining the velocity at which arterial pressure wave travels between two points on an artery. From this one can calculate the distensibility of the artery which is percentage volume per unit change in pressure.

Distensibility depending upon the elastic properties of the wall of the vessel as well as dimensions.

This measure of distensibility is helpful in testing patients with arterial vascular diseases. Knowing the speed of the recorder one can calculate the time between the blips of the pulse wave and therefore the pulse wave velocity can be measured by dividing the distance between the two points at which the readings are taken on an artery, by the time interval.

The distensibility can then be calculated by the empirical formula $12.7/V^2$ where V is the velocity of the pulse wave.

Each systole and diastole of the pressure pulse wave is transmitted through the blood and saline solution onto the aforementioned diaphragm 53 so that the disc vibrates in unison with the pulsating blood. This is transmitted to the face of the transducer thus sending the pulse signal to the electronic section which amplifies the section and drives the recorder to obtain the aforementioned blip.

The transducer shown in FIG. 2 may be placed directly on the surface of the skin above an artery and will produce interesting arterial pulse waves of different shapes and amplitudes depending upon which artery the transducer is used, i.e., radial, femoral, carotid, facial, etc.

When used on an extremity as a thumb or toe, the device will indicate pulse pressure changes during the course of surgery. If this pulse pressure is recorded, by recorder 49, the technique can serve as a quantitative record of the patient's blood pressure trend during prolonged surgery.

It will therefore be seen that we have provided an instrument that is completely transistorized, light in weight, portable and relatively inexpensive, safe and free of any electric or explosive hazards and which is simple and easy to use.

Since various modifications can be made of the invention herein described within the scope of the inventive concept disclosed, it is not intended that protection of the said invention should be interpreted as restricted to the modification or modifications or known parts of such concept as have been particularly described, defined, or exemplified, since this disclosure is intended to explain the construction and operation of such concept, and not for the purpose of limiting protection to any specific embodimentor details thereof.

We claim:

1. A physiological meter for indicating the pulsation of blood vessels comprising in combination a transducer, a pair of multi-stage amplifiers capacitively coupled together, an output amplifier and gating circuit connected to said pair of multistage amplifiers, audible impulse indicating means operatively connected to said output amplifier and gating circuit, said transducer being operatively connected to the input of the first of said pairs of multi-stage amplifiers, said transducer comprising a substantially cylindrical magnet having an open ended core at one end thereof, a voice coil having an open end and mounted for linear movement around said open ended core whereby said linear movement causes said voice coil to cut the magnet lines of force of said magnet thereby generating an electrical impulse in said voice coil, a diaphragm spanning the open end of said voice coil, and resilient buffer means between and in contact with said diaphragm and the core of said magnet to eliminate direct contact between said diaphragm and said core.

2. The device according to claim 1 which includes an hydraulic coupling coupled to said transducer, a flexible diaphragm between said first mentioned diaphragm of said voice coil, and said coupling, said coupling comprising a hollow cylinder containing an hydraulic fluid, and an intra-arterial catheter connector formed on one end of said cylinder and communicating with the interior thereof.

3. The device according to claim 1 which includes also a visual indicating meter connected to the output of the second of said pair of multi-stage amplifiers.

4. The device according to claim 2 which includes also a visual indicating meter connected to the output of the second of said pair of multi-stage amplifiers.

5. The device according to claim 1 in which said resilient buffer means comprise an annular ring of resilient material situated on the open end of said core of said magnet and behind said diaphragm.

6. The device according to claim 2 in which said resilient buffer means comprise an annular ring of resilient material situated on the open end of said core of said magnet and behind said diaphragm.

7. The device according to claim 3 in which said resilient buffer means comprise an annular ring of resilient material situated on the open end of said core of said magnet and behind said diaphragm.

8. The device according to claim 4 in which said resilient buffer means comprise an annular ring of resilient material situated on the open end of said core of said magnet and behind said diaphragm.

References Cited

UNITED STATES PATENTS

| | | | |
|---|---|---|---|
| 2,001,537 | 5/1935 | Mason | 181—24 |
| 2,702,354 | 2/1955 | Chorpening | 310—8.6 |
| 3,027,891 | 4/1962 | Fields et al. | 128—2.06 |
| 3,038,465 | 6/1962 | Allard et al. | 128—2.05 |
| 3,144,018 | 8/1964 | Head | 128—2.1 |
| 3,294,988 | 12/1966 | Packard | 310—8 |
| 3,316,897 | 5/1967 | Weidinger et al. | 128—2.06 |
| 3,338,234 | 8/1967 | Kleinerman et al. | 128—2.06 |
| 3,167,658 | 1/1965 | Richter | 128—2.05 X |

FOREIGN PATENTS 640,853    1/1937    Germany.

WILLIAM E. KAMM, Primary Examiner

U.S. Cl. X.R.

179—115.5